United States Patent [19]

Katayama

[11] Patent Number: 4,643,045
[45] Date of Patent: Feb. 17, 1987

[54] POWER TRANSFER DEVICE FOR FOUR WHEEL DRIVE

[75] Inventor: Nobuaki Katayama, Toyota, Japan

[73] Assignee: Toyota Jidosha Kabushiki Kaisha, Japan

[21] Appl. No.: 629,519

[22] Filed: Jul. 10, 1984

[30] Foreign Application Priority Data

Jul. 11, 1983 [JP] Japan .................. 58-125665

[51] Int. Cl.$^4$ .......................................... F16A 37/08
[52] U.S. Cl. ........................................ 74/695; 180/249
[58] Field of Search ............... 74/705, 701, 700, 695, 74/665 GC, 665 GA; 180/248, 249, 250

[56] References Cited

U.S. PATENT DOCUMENTS

| | | | |
|---|---|---|---|
| 3,400,777 | 9/1968 | Hill ...................................... | 180/249 |
| 4,417,642 | 11/1983 | Suzuki et al. ....................... | 180/249 |
| 4,431,079 | 2/1984 | Suzuki ................................. | 74/695 X |
| 4,441,575 | 4/1984 | Suzuki ................................. | 180/250 X |
| 4,449,604 | 5/1984 | Suzuki ................................. | 180/248 X |
| 4,457,394 | 7/1984 | Suzuki ................................. | 74/695 X |
| 4,476,953 | 10/1984 | Hiraiwa .............................. | 180/249 |

FOREIGN PATENT DOCUMENTS 58-63523 10/1983 Japan .

*Primary Examiner*—Kenneth J. Dorner
*Assistant Examiner*—Dirk Wright
*Attorney, Agent, or Firm*—Parkhurst & Oliff

[57] ABSTRACT

A power transfer device for four-wheel drive in combination with a power transmission comprises a transfer casing detachably secured at one side thereof to the transmission casing, first and second inner casings respectively assembled within the transmission and transfer casings in a coaxial relationship, a first ring gear integral with the first inner casing and in mesh with an output gear of the transmission, a second ring gear integral with the second inner casing and drivingly connected to rear-wheel axles, a first differential gear unit for front-wheel drive assembled within the first inner casing, a second differential gear unit assembled within the second inner casing and drivingly connected to the first inner casing and to the first differential gear unit, and a locking mechanism for locking the second differential gear unit.

7 Claims, 3 Drawing Figures

POWER TRANSFER DEVICE FOR FOUR WHEEL DRIVE

BACKGROUND OF THE INVENTION

The present invention relates to a power transmission for automotive vehicles, and more particularly to a power transfer device for four-wheel drive in combination with a power transmission transversely assembled to a cylinder block of an internal combustion engine.

A conventional power transfer device for four-wheel drive as described above has been proposed as is illustrated in FIG. 3 of the accompanying drawings. The power transfer device is adapted to a conventional power transmission for front-wheel drive, wherein an intermediate differential gear unit 1 is substituted for an original differential gear unit for front-wheel drive to split the driving power from the transmission into two delivery paths respectively for front-wheel drive and rear-wheel drive and wherein a trasnfer casing 3 is secured at its one side seating face to a transmission casing 2 to contain a differential gear unit 4 for front-wheel drive and an output gearing including gears 5, 6 and 7 for rear-wheel drive. In such an arrangement, the differential gear unit 4 is spaced in a distance L from the intermediate differential gear unit 1. For this reason, vibration system of front-wheel axles 8 and 9 connected to the differential gear unit 4 becomes greatly different from that of front wheel axles connected to the original differential gear unit. This means that is is required to change component parts of the front suspension system for the vehicle. Furthermore, the differential gear unit 4 is supported at its one end by a tapered roller bearing 12 carried on the transfer casing 3, while the gear 5 is supported also at its one end by a tapered roller bearing 10 carried on the transfer casing 3 and connected to the other end of unit 4 by means of a tapered roller bearing 11. In such a mounting construction, the support of gear 5 is insufficient in strength, and durability of the intermediate roller bearing 11 will lower due to the load acting thereto in operation. Additionally, undesired vibration noises will occur due to such unstable support of the intermediate roller bearing 11. When the differential gear unit 4 is connected to the gear 5 to lock the intermediate differential gear unit 1, there will occur defacement of the intermediate roller bearing 11 due to an excessive load acting thereto.

SUMMARY OF THE INVENTION

It is, therefore, a primary object of the present invention to provide an improved power transfer device for four-wheel drive the component parts of which are substantially common to those of the original differential gear unit to effect reliable function of the suspension system without any change of its component parts Another object of the present invention is to provide an improved power transfer device for four-wheel drive the component parts of which are arranged within the transfer casing to enhance durability of the device and to eliminate undesired vibration noises.

According to the present invention there is provided a power transfer device for four-wheel drive in combination with a power transmission having a transmission casing secured at one side thereof to a cylinder block of an internal combustion engine, an input shaft rotatably mounted within the transmission casing and arranged coaxially with a crankshaft of the engine, an output shaft rotatably mounted within the transmission casing in parallel with the input shaft, a change-speed gearing mounted on the input and output shafts, and an output gear integral with the output shaft, wherein the power transfer device comprises an transfer casing detachably secured at one side thereof to the transmission casing, a first inner casing rotatably mounted within the transmission casing, a second inner casing rotatably mounted within the transfer casing and arranged coaxially with the first inner casing, an output gearing mounted within the transfer casing for connection to rear-wheel axles (or front-wheel axles), a first ring gear integral with the first inner casing and in mesh with the output gear on the output shaft, a second ring gear integral with the second inner casing and drivingly connected with the output gearing, a first differential gear unit rotatably assembled within the first inner casing, a first front-wheel axle (or a first rear-wheel axle) drivingly connected at its inner end with the first differential gear unit and extending outwardly through the first inner casing, and a second front-wheel axle (or a second rear-wheel axle) drivingly connected at its inner end with the first differential gear unit and extending outwardly through the second inner casing. The transfer device further comprises a second differential gear unit rotatably assembled within the second inner casing in surrounding relationship with the second front-wheel axle (or the second rear-wheel axle) and drivingly connected to the first inner casing and to the first differential gear unit, and means for locking the second differential gear unit.

In the case that the power transfer device is adapted to an automotive vehicle of the front-engine front-wheel drive type, the transfer casing is located at the rear of the engine in such a manner that the front-wheel axles are arranged in parallel with the input and output shafts.

In the actual practices of the present invention, it is desirable that the first inner casing is rotatably supported by a pair of axially spaced bearings carried on the transmission casing while the second inner casing is rotatably supported by a pair of axially spaced bearings carried on the transfer casing. It is also desirable that a first hollow shaft is arranged in surrounding relationship with the second front-wheel axle to drivingly connect the first differential gear unit to the second differential gear unit and a second hollow shaft is arranged in surrounding relationship with the first hollow shaft to drivingly connect the first inner casing to the second differential gear unit.

BRIEF DESCRIPTION OF THE DRAWINGS

Additional objects and advantages of the present invention will become readily apparent from the following detailed description of a preferred embodiment thereof when taken together with the accompanying drawings, in which.

DETAILED DESCRIPTION OF THE PREFERRED EMBODIMENT

Figure 1:
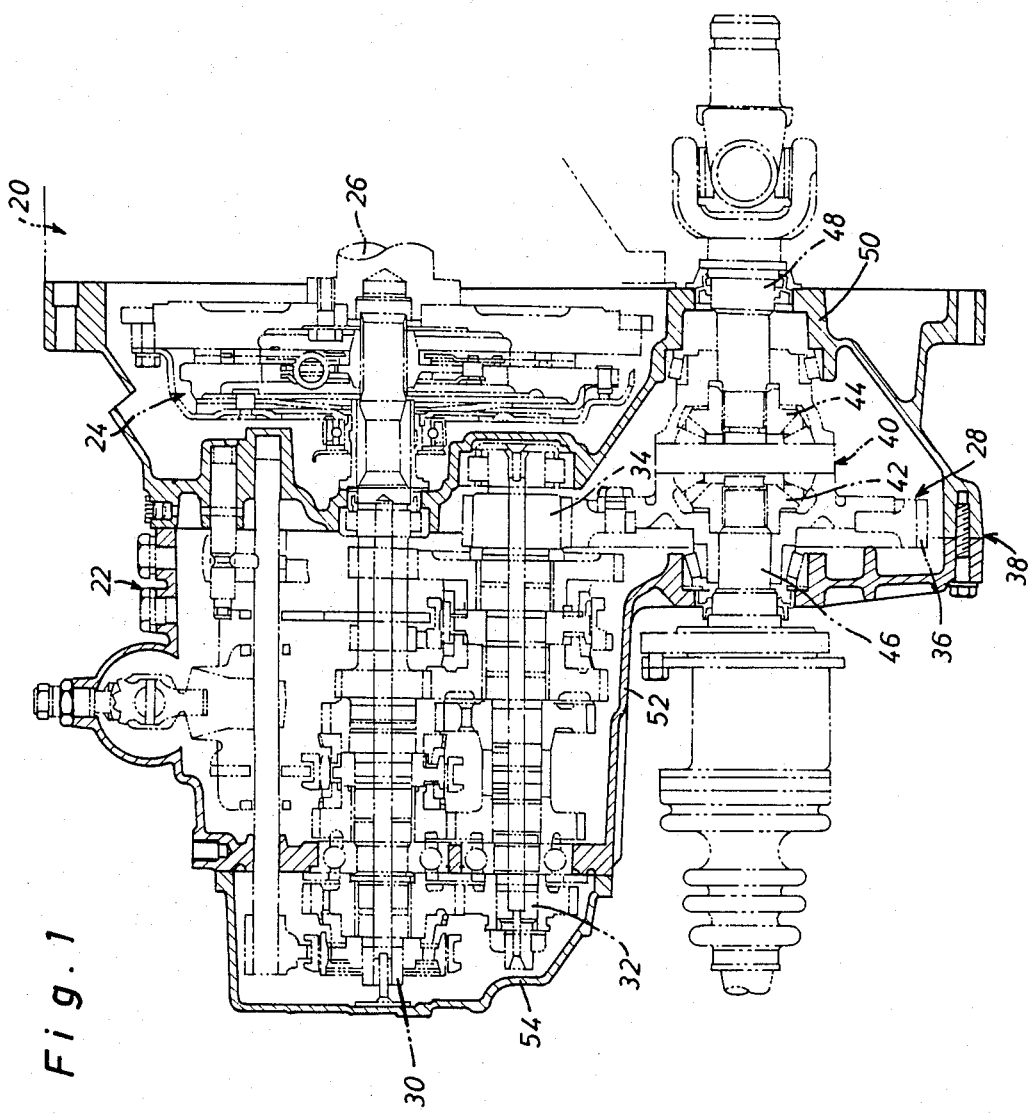
FIG. 1 is a sectional view of a power transmission including a differential gear unit for front-wheel drive.

Referring now to the drawings, FIG. 1 illustrates a power transmission 22 for a vehicle of the front-engine front-wheel drive type to which a power transfer device for four-wheel drive according to the present invention is adapted. The power transmission 22 is fixedly mounted to one side of an internal combustion engine 20 through a clutch device 24. The engine 20 is arranged within a front engine room of the vehicle in such a manner that a crankshaft 26 of the engine is transversely placed. The power transmission 22 includes a transmission casing assembly 38 secured at one side thereof to a cylinder block of the engine 20, an input shaft 30 rotatably mounted within the transmission casing assembly 38 and arranged coaxially with the crankshaft 26, an output shaft 32 rotatably mounted within the transmission casing assembly 38 and arranged in parallel with the input shaft 30, a change-speed gearing mounted on the input and output shafts 30, 32, and a final drive gearing 28 assembled within the casing assembly 38. The final drive gearing 28 comprises a ring gear 36 permanently in mesh with an output gear 34 integral with output shaft 32, and a differential gear unit 40 of the bevel gear type for front-wheel drive on which the ring gear 36 is fixedly mounted. The differential gear unit 40 includes a pair of side gears 42 and 44 which are drivingly connected to front-wheel axles 46 and 48 respectively. The transmission casing assembly 38 comprises first, second and third casing sections 50, 52 and 54.

Figure 2:
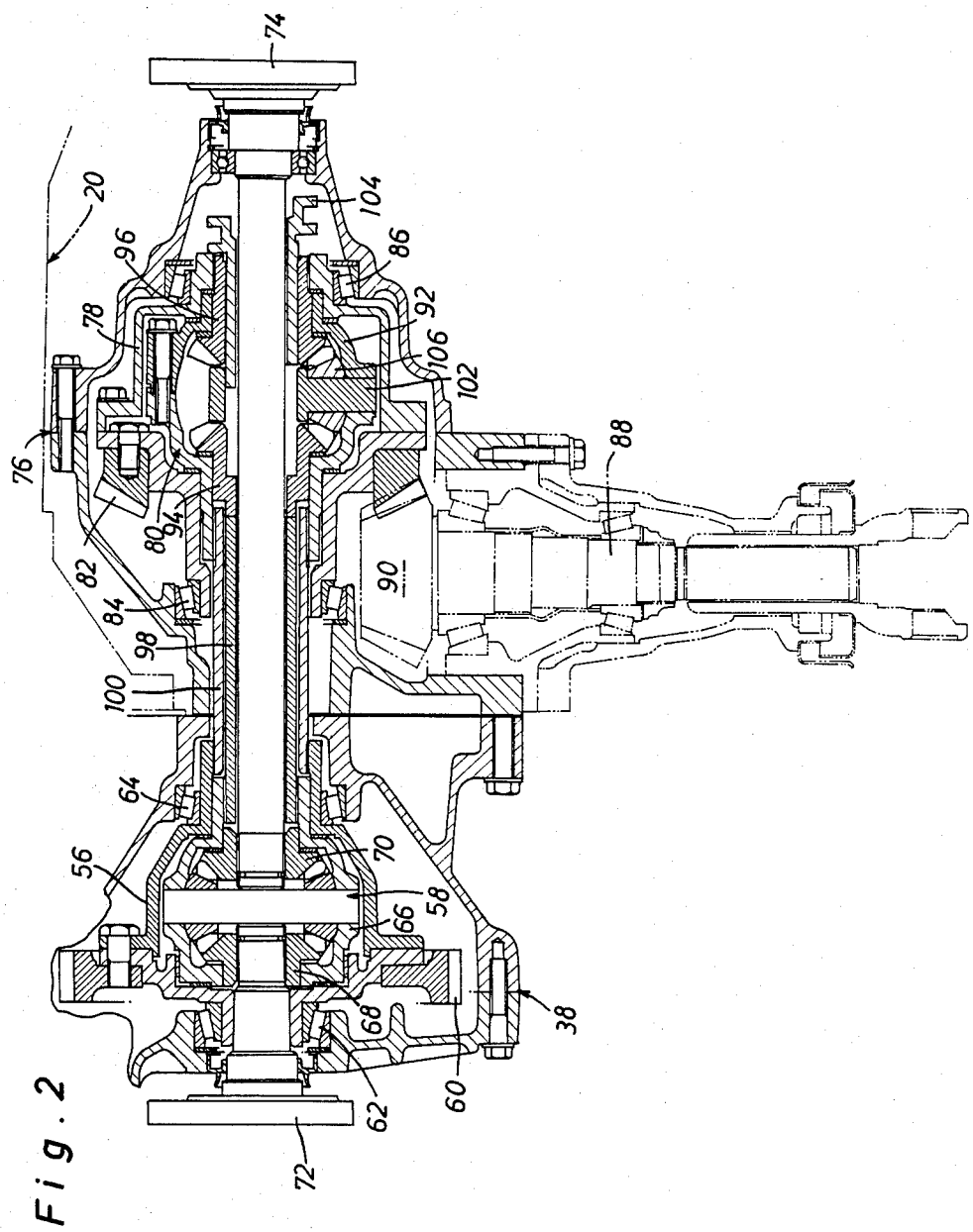
FIG. 2 is a sectional view of a power transfer device in combination with the power transmission of FIG. 1 in accordance with the present invention.
Figure 3:
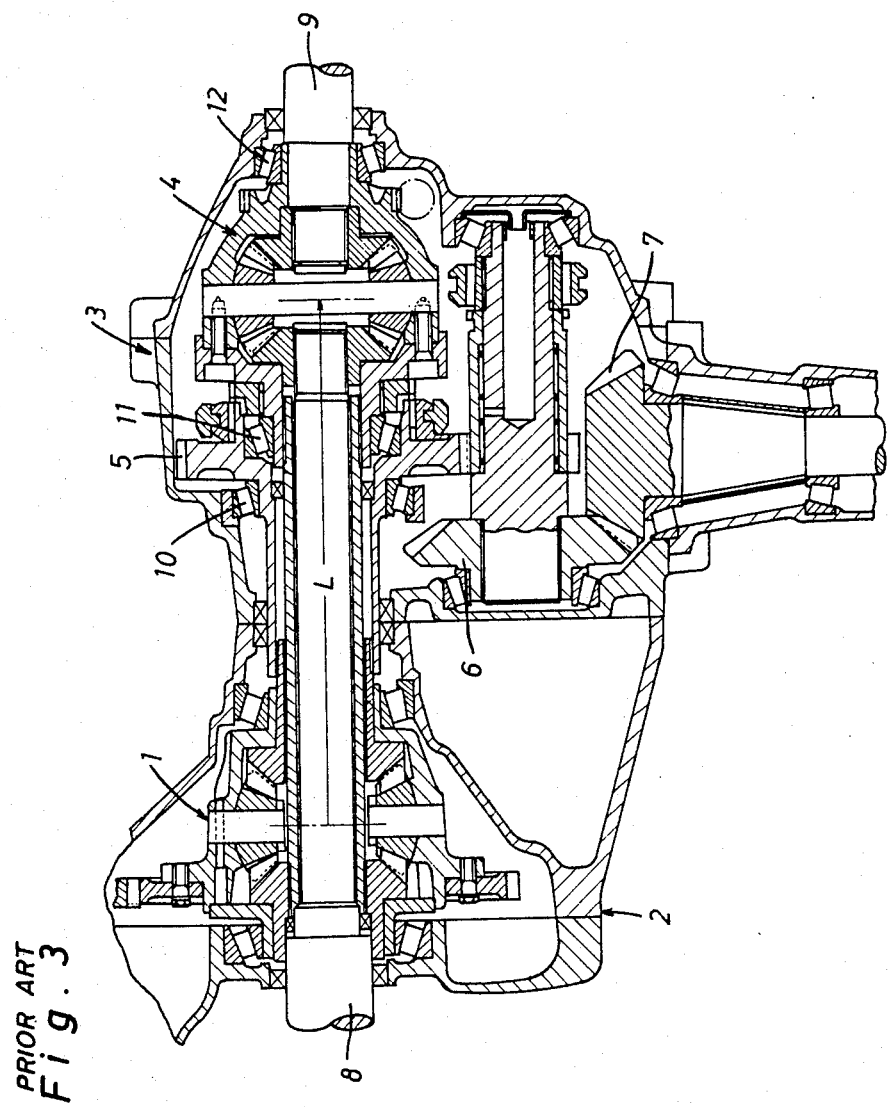
FIG. 3 is a sectional view of a conventional power transfer device in combination with the power transmission.

In FIG. 2 there is illustrated the power transfer device for four-wheel drive according to the present invention, in which the original ring gear 36 and differential gear unit 40 are replaced with a first ring gear 60 and a first inner casing 56. The first ring gear 60 is integrally mounted on the first inner casing 56 and permanently in mesh with the output gear 34 of FIG. 1. The first inner casing 56 is rotatably supported at its opposite ends by a pair of tapered roller bearings 62 and 64 which are carried on the first casing section 50 of casing assembly 38. The power transfer device comprises a first differential gear unit 58 of the bevel gear type for front-wheel drive rotatably mounted within the first inner casing 56. The first differential gear unit 58 comprises a gear case 66 rotatably assembled within the first inner casing 56, and a pair of side gears 68 and 70 which are drivingly connected to the inner ends of front-wheel axles 72 and 74.

The power transfer device further comprises a transfer casing assembly 76 which is detachably secured in a fluid-tight manner at its left end seating face to the right end seating face of first casing section 50. In this embodiment, the transfer casing assembly 76 is located at the rear of the engine 20 and is constructed to be divided into left and right casings. In the case that the first inner casing 56 and the first differential gear unit 58 are arranged below the input and output shafts 30 and 32 of the power transmission 22, the transfer casing assembly 76 is located below the engine 20. Assembled within the transfer casing assembly 76 is a second inner casing 78 in which an intermediate differential gear unit 80 is rotatably assembled. The intermediate differential gear unit 80 is arranged coaxially with the differential gear unit 58 for front-wheel drive. The second inner casing 78 is constructed to be divided into left and right casings and is rotatably supported by a pair of tapered roller bearings 84 and 86 which are carried on the transfer casing assembly 76. A second ring gear 82 for rear-wheel drive is fixedly mounted on the second inner casing 78 and permanently in mesh with a drive pinion 90 of a pinion shaft 88 which is rotatably mounted within the transfer casing assembly 76. The pinion shaft 88 is arranged in a fore-and-aft direction of the vehicle and drivingly connected in a usual manner to rear-wheel axles (not shown) by way of a propeller shaft and a final drive gearing for rear-wheel.

The intermediate differential gear unit 80 comprises a gear case 92 rotatably assembled within the second inner casing 78, a pair of side gears 94 and 96 journalled on the gear case 92 in surrounding relationship with the front-wheel axle 74, and a pinion 106 journalled on a pinion shaft 102 integral with the gear case 92. In such an arrangement, the front-wheel axle 74 extends outwardly from the right end of transfer casing assembly 76 through the side gears 94 and 96. The side gear 94 is integrally secured by friction welding to the right end of a first hollow shaft 98 which is arranged in surrounding relationship with the front-wheel axle 74 and integrally connected at the left end thereof with the gear case 66 of the differential gear unit 58 by means of a spline connection to effect power transmission from the side gear 94 of the intermediate differential gear unit 80 to the differential gear unit 58 for front-wheel drive. On the other hand, the side gear 96 is integrally connected to the second inner casing 78 by means of a spline connection, and the gear case 92 of unit 80 is drivingly connected by a spline at its left end to the right end of a second hollow shaft 100 which is in surrounding relationship with the first hollow shaft 98 and integrally connected by a spline at the left end thereof with the first inner casing 56 to effect power transmission from the first inner casing 56 to the intermediate differential gear unit 80.

Assembled at the right side of intermediate differential gear unit 80 is a user actuable sleeve member 104 which is axially slidably mounted on the front axle 74 to selectively effect engagement and disengagement between the side gear 96 and the pinion shaft 102 integral with gear case 92. The sleeve member 104 is arranged to be axially slidably coupled with the side gear 96 and the pinion shaft 102 by a spline connection. When moved inwardly as is illustrated by an upper half in the figure, the sleeve member 104 is brought into engagement with the side gear 96 and the pinion shaft 102 to lock the intermediate differential gear unit 80. When moved outwardly as is illustrated by a lower half in the figure, the sleeve member 104 disengages from the pinion shaft 102 to permit relative rotation of the side gears 94 and 96 thereby to make the intermediate differential gear unit 80 operative.

In operation of the power transfer device for four-wheel drive in combination with the power transmission 22, the driving power of engine 20 is applied to the input shaft 22 through the clutch device 24 and transmitted at a selected gear ratio to the output shaft 32 by way of the change-speed gearing. Thus, the driving power from output shaft 32 is applied to the first inner casing 56 by way of the ring gear 60 and transmitted to the intermediate differential gear unit 80 by way of the second hollow shaft 100. Subsequently, the transmitted power is split into two torque delivery paths through pinion shaft 102 of the unit 80 and respectively applied to the side gears 94 and 96. The driving torque from side gear 94 is transmitted to the differential gear unit 58 for front-wheel drive by way of the first hollow shaft 98 and finally transmitted to the left and right front-wheel axles 72 and 74 through side gears 68 and 70 of the unit 58. On the other hand, the driving torque from side gear 96 is transmitted to the pinion gear 90 by way of the second inner casing 78 and the ring gear 82 for rear-wheel drive and finally transmitted to the rear-wheel axles by way of the propeller shaft and the final drive gearing.

Assuming that engagement of the side gear 96 with the pinion shaft 102 is effected by inward movement of the sleeve member 104 during the above operation, the intermediate differential gear unit 80 is locked to disable relative rotation of the side gears 94 and 96. Thus, the differential gear unit 58 for front-wheel drive and the ring gear 82 for rear-wheel drive are applied with the same driving torque. Assuming that the side gear 96 disengages from the pinion shaft 102 by outward displacement of the sleeve member 104 during the above operation, the intermediate differential gear unit 80 is operative to permit relative rotation of th side gears 94 and 96. Thus, the differential gear unit 58 for front-wheel drive and the ring gear 82 for rear-wheel drive are respectively applied with a driving torque in accordance with respective loads acting thereto.

In the arrangement of the power transfer device described above, it is to be noted that the power transmission 22 for front-wheel drive of FIG. 1 is utilized as a basic construction for the power transfer device for four-wheel drive. That is, the original differential gear unit 40 for front-wheel drive is replaced with the differential gear unit 58 for front-wheel drive contained within the first inner casing 56, and the second inner casing 78 and the intermediate differential gear unit 80 are coaxially arranged with the first inner casing 56 and the differential gear unit 58 within the transfer casing assembly 76 which is integrally fixed in a simple manner to the transmission casing assembly 38 of FIG. 1. Thus, the intermediate differential gear unit 80 is drivingly connected in a simple manner to the differential gear unit 58 by means of the first and second hollow shafts 98 and 100 in surrounding relationship with the front axle 74.

With the above-described construction, the component parts for both the differential gear units 58 and 80 can be made substantially common to those of the original differential gear unit 40 in the power transmission to be manufactured at a low cost. Furthermore, a suspension system for the front axles 72 and 74 can be constructed substantially as same as that for the front-wheel drive vehicle. This means that common component parts for the suspension system of the front-wheel drive vehicle can be adapted to the four-wheel drive vehicle at a low cost. Additionally, sufficient supporting rigidity of the first and second inner casings 56, 78 is obtained in a simple construction, and durability of the component parts of the inner casings and differential gear units is reliably ensured.

Although in the above embodiment the power transfer device of the present invention is adapted to a vehicle of the front-engine four-wheel drive type, it may be adapted to a vehicle of the rear-engine four-wheel drive type. In such a case, the ring gear 82 for rear-wheel drive is replaced with a ring gear for front-wheel drive, the differential gear unit 58 for front-wheel drive is replaced with a differential gear unit for rear-wheel drive, and the transfer casing assembly 76 is located at the front of the engine or below the engine. Alternatively, the intermediate differential gear unit 80 may be replaced with a conventional planetary gear unit.

Having now fully set forth structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A power transfer device for four-wheel drive in combination with a power transmission having a transmission casing secured at one side thereof to a cylinder block of an internal combustion engine, an input shaft rotatably mounted within said transmission casing and arranged coaxially with a crankshaft of said engine, an output shaft rotatably mounted within said transmission casing in parallel with said input shaft, a change-speed gearing mounted on said input and output shafts, and an output gear integral with said output shaft, the power transfer device comprising:

a transfer casing detachably secured at one side thereof to said transmission casing;

a first inner casing positioned within said transmission casing and rotatably supported by a pair of axially spaced bearings which are supported by said transmission casing;

a second inner casing positioned within said transfer casing coaxially with said first inner casing and rotatably supported by a pair of axially spaced bearings which are supported by said transfer casing;

an output gearing assembled within said transfer casing;

a first ring gear mounted on said first inner casing for rotation therewith and in mesh with said output gear on said output shaft;

a second ring gear mounted on said second inner casing for rotation therewith and drivingly connected to said output gearing;

a first differential gear unit for front wheel drive positioned within said first inner casing, said first differential gear unit including a first gear case rotatably mounted within said first inner casing;

a first wheel axle having an inner end, said inner end being drivingly connected with said first differential gear unit and extending outwardly through said first inner casing;

a second wheel axle having an inner end, said inner end being drivingly connected with said first differential gear unit and extending outwardly through said first and second inner casing;

a second differential gear unit for rear wheel drive positioned within said second inner casing, said second differential gear unit including a second gear case rotatably mounted within said second inner casing, in surrounding relationship with said second wheel axle and drivingly connected to said first inner casing and, an output element journaled on said second gear case and drivingly connected to said first gear case, to said first differential gear unit; and means for locking said second differential gear unit.

2. A power transfer device as claimed in claim 1, wherein said transfer casing is located at the rear of said engine in such a manner that said first and second wheel axles are arranged in parallel with said input and output shafts.

3. A power transfer device as claimed in claim 1, wherein a first hollow shaft is arranged in surrounding relationship with said second wheel axle to drivingly connect said first differential gear unit to said second differential gear unit, and a second hollow shaft is arranged in surrounding relationship with said first hollow shaft to drivingly connect said first inner casing to said second differential gear unit.

4. A power transfer device as claimed in claim 1, wherein the component parts of said first differential gear unit are substantially common to those of an original differential gear unit for front-wheel drive assembled within said transmission casing.

5. A power transfer device for four-wheel drive in combination with a power transmission having a transmission casing secured at one side thereof to a cylinder block of an internal combustion engine, an input shaft rotatably mounted within said transmission casing and arranged coaxially with a crankshaft of said engine, an output shaft rotatably mounted within said transmission casing in parallel with said input shaft, a change-speed gearing mounted on said input and output shafts, and an output gear integral with said output shaft, the power transfer device comprising:
   a transfer casing detachably secured at one side thereof to said transmission casing;
   a first inner casing positioned within said transmission casing and rotatably supported by a pair of axially spaced bearings carried on said transmission casing;
   a second inner casing positioned within said transfer casing coaxially with said first inner casing and rotatably supported by a pair of axially spaced bearings which are supported by said transfer casing;
   a drive pinion integral with a pinion shaft rotatably mounted within said transfer casing for connection to rear-wheel axles;
   a first ring gear mounted on said first inner casing for rotation therewith and in mesh with said output gear on said output shaft;
   a second ring gear mounted on said second inner casing for rotation therewith and in mesh with said drive pinion;
   a first differential gear unit for front wheel drive positioned within said first inner casing and including a first gear case rotatably mounted within said first inner casing, a pinion journalled on said first gear case, and a pair of side gears journalled on said first gear case and in mesh with said pinion;
   a pair of first and second front-wheel axles respectively connected at their inner ends to said side gears, said first front-wheel axle extending outwardly through said first inner casing, and said second front-wheel axle extending outwardly through said first and second inner casings;
   a second differential gear unit for rear wheel drive positioned within said second inner casing and including a second gear case rotatably mounted within said second inner casing, a pair of side gears journalled on said second gear case, and a pinion journalled on said second gear case and in mesh with said side gears, one of said side gears being integrally connected to said second inner casing;
   a first hollow shaft arranged in surrounding relationship with said second front-wheel axle between said first and second inner casings and being integrally connected at one end thereof with said first gear case and at the other end thereof with the other side gear of said second differential gear unit;
   a second hollow shaft arranged in surrounding relationship with said first hollow shaft between said first and second inner casings and being integrally connected at one end thereof with said first inner casing and at the other end thereof with said second gear case of said second differential gear unit; and
   means for locking relative rotation of said side gears in said second differential gear unit.

6. A power transfer device as claimed in claim 5, wherein said transfer casing is located at the rear of said engine in such a manner that said front-wheel axles are arranged in parallel with said input and output shafts, and wherein said pinion shaft is arranged in a fore-and-aft direction of the vehicle.

7. A power transfer device as claimed in claim 5, wherein said means for locking relative rotation of said side gears in said second differential gear unit comprises a user actuable sleeve member axially slidably mounted on said second front-wheel axle and movable between a first position in which said sleeve member is positioned to disengage the one of said side gears from said second gear case and a second position in which said sleeve member is positioned to engage the one of said side gears with said second gear case.

* * * * *